United States Patent [19]
Hansen et al.

[11] 3,825,819
[45] July 23, 1974

[54] DYNAMIC PROOF LOADING OF METAL BOND STRUCTURES USING PULSED MAGNETIC FIELDS

[75] Inventors: Karl A. Hansen, Seattle; Clarence D. Lunden, Federal Way, both of Wash.

[73] Assignee: The Boeing Company, Seattle, Wash.

[22] Filed: Mar. 12, 1973

[21] Appl. No.: 340,191

[52] U.S. Cl. .............................. 324/34 R, 73/150 A
[51] Int. Cl. ........................................... G01b 19/02
[58] Field of Search.......... 324/34 R; 73/150, 150 A

[56] References Cited

OTHER PUBLICATIONS

Krongelb; IBM Tech. Disc. Bul.; Sept. 1969, p. 519.
Phillips et al., IBM Tech. Disc. Bul.; April 1971, p. 3,227.

Primary Examiner—Alfred E. Smith
Attorney, Agent, or Firm—Christensen, O'Connor, Garrison & Havelka

[57] ABSTRACT

A method and apparatus for developing tensile stress within bonded metal structures. A magnetic field is first developed slowly in the bonded metal structure by pulsing a coil adjacent the metal structure with a high energy electric pulse. At substantially the peak of the slow high energy pulse, a comparatively fast pulse in an opposing current direction is applied through the coil adjacent the same surface. The fast negative pulse effectively shuts off the slow pulse, resulting in a very rapid decrease in the magnetic field adjacent the surface of the metal structure. The magnetic field internal the structure initially established by the slow pulse is, during the fast negative pulse, at or near a maximum, and just beginning to diffuse through the structure. This creates a large negative magnetic field gradient across the structure from internal the structure to the surface nearest the coils, and thus, a resulting large tensile stress on the bond line.

18 Claims, 6 Drawing Figures

DYNAMIC PROOF LOADING OF METAL BOND STRUCTURES USING PULSED MAGNETIC FIELDS

BACKGROUND OF THE INVENTION

This invention relates generally to the art of pulsed magnetic fields, and more specifically to that art utilizing pulsed magnetic fields to create selected forces for a variety of purposes.

In the fabrication of machines or systems utilizing metal structures, designers and fabricators have increasingly utilized laminated or bonded metal parts where appropriate. Laminated metal structures, such as the honeycomb construction of FIG. 1, or the straight metal-to-metal bond of FIG. 2, are well-known for their properties of high strength/weight ratio, and significantly longer working life than solid metal structures. The laminate approach to metal structural design is particularly applicable in modern aircraft, where the above-noted advantages of laminates become very significant. A vital concern in the metal laminate art, however, is the strength and the continuity of the adhesive bond line. In the fabrication of metal laminate structures, whether they are comprised of a plurality of metal sheets sandwiched into a complex cross-sectional structure, or comprised of merely two metal sheets with a single adhesive bond line, it is possible that the adhesive bond may be either discontinuous or sufficiently weak at various points such that the laminate structure itself would fail under ordinary environmental stresses.

In response to this obvious concern over the strength and continuity of the laminate bond, a variety of testing procedures have been developed having the purpose of accurately assessing the strength of the bond, both immediately after fabrication, and also after some period of actual structural use, so as to maintain a continuing check on the strength of the bond. Present methods for testing bond strength and quality can be divided into two approaches, one being destructive, and the other being nondestructive of the article under test.

Destructive methods, which are currently the most frequently used in airplane laminates, include first the standard peel and shear test, in which a portion of a specimen is cut and then peeled back from the rest of the structure by means of brute force. In this test, the amount of force necessary to so peel the specimen is measurable and recorded for analysis. Another method of destructive testing currently used is to completely destroy a certain percentage of actual production articles, again measuring the force necessary to accomplish it. Another method utilizes a small tab attached to or part of each production article, the tab being destroyed by shear methods to determine the bond strength of the tab. If the tab strength thus meets required specifications, it is assumed that the production article will also, and the article is then passed. These methods, however, all have marked disadvantages, in that the actual article or portion of the article selected for testing is destroyed and must either be repaired or entirely discarded after the test is completed. Furthermore, it is relatively slow and expensive, and certainly does not allow testing of the entire bond line of each production article.

Nondestructive testing methods include such ancient and crude methods as tapping production structures to detect bond voids, as well as extremely sophisticated ultrasonic and thermal methods. A disadvantage to all these methods, however, is that they do not develop an actual pressure in testing the strength of a bond, and are often unreliable in indicating bond weaknesses.

Thus, at this point in time, metal laminates suffer from a lack of a nondestructive test of quality assurance. Up to the time of the present invention, there has been no satisfactory testing procedure to determine the bond strength of each production run of metal laminate articles, and their use has been rather restricted as a result. Their exceptional qualities in certain applications have thus up to this point been largely unused.

In view of the above, it is a general object of the present invention to overcome the disadvantages of the prior art.

It is another object of the present invention to provide a system capable of producing tensile pressure within a metal laminate structure.

It is a further object of the present invention to use magnetic fields for nondestructive testing of metal laminate structures.

It is a still further object of the present invention to provide a contactless system of applying pressure to a given structure.

It is a still further object of the present invention to provide a system of magnetic testing in which large pressures may be exerted on a particular object from one side only.

Other and further objects, features and advantages of the invention will become apparent as the description proceeds.

SUMMARY OF THE INVENTION

Briefly, in accordance with a preferred embodiment, the present invention includes establishing a pulsing magnetic field within a metal laminate article, including the bond line to be tested by means of a source outside of the article, and then substantially decreasing the magnetic field at one surface of the article before the amplitude of the magnetic field within the bond line to be tested is decreased. This creates a large magnetic field gradient between the bond line and the one surface, which creates a large tensile pressure on the bond line, tending to force the surface sheet away from the bond line.

DESCRIPTION OF THE PREFERRED EMBODIMENT

Figure 1:
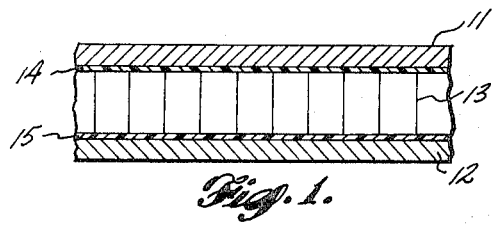
FIG. 1 is a diagram of a bonded honeycomb metal article.
Figure 2:
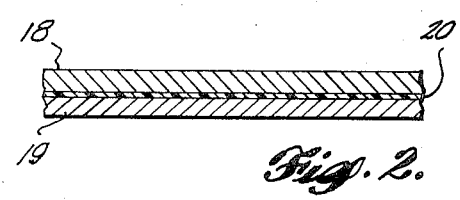
FIG. 2 is a diagram of a metal-to-metal bonded article.

Referring to FIGS. 1 and 2, typical metal laminate constructions are shown. FIG. 1 shows what is commonly referred to as a honeycomb structure, comprising two metal face sheets 11 and 12, the face sheets being of variable cross section dimension, but typically 0.02 to 0.1 inches in the aircraft industry. Arranged between the two metal face sheets 11 and 12 is a typical honeycomb metal structure 13 well-known in the art. The two metal face sheets are secured to the honeycomb structure 13 by any well-known metal adhesive, forming bond lines 14 and 15.

FIG. 2 shows another typical application of metal laminate structures, wherein two metal face sheets 18 and 19 are laminated by means of an adhesive, forming bond line 20. Again, in the aircraft industry, the thickness of each metal sheet is typically between 0.02 and 0.1 of an inch, although other thicknesses may certainly be utilized. Furthermore, rather complex metal structures for specific applications may be received by utilizing various materials, and material thicknesses.

In the course of fabricating these metal articles by adhesives, however, small discontinuities or weak points in some bond lines, leading to the possible failure of the article, will occur. Furthermore, after the article has been incorporated in a machine or other device, and put into actual use, it may be desirable at selected points in time to again evaluate the strength of the bond. To nondestructively test the bond strength of such metal laminates, the method and apparatus of the present invention, illustrated in a simplified fashion in FIG. 3, has been developed.

Figure 3:
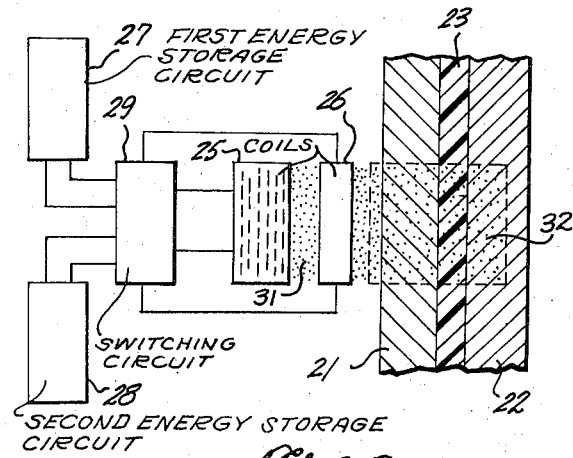
FIG. 3 is a simplified block diagram demonstrating the principles of the present invention.

Referring to FIG. 3, two metal face sheets 21 and 22 and the adhesive bond line 23 of a standard metal-to-metal laminate is shown in greatly magnified perspective, for purposes of illustration. A pair of coils 25 and 26 are provided adjacent the surface of the article to be tested. Two energy storage devices, typically large capacitor banks, 27 and 28 are provided, along with an associated switching circuit 29 to feed the coils 25 and 26. A first energy storage circuit 27 is initially energized, providing a slowly rising high amplitude current pulse through coil 25. The current in coil 25 thus increases slowly from zero to a given peak value in a variable time from 0.2 milliseconds to 10 milliseconds. The peak current level and the time necessary to reach it depends on the material utilized. For aluminum, the peak current would be approximately 30 K amps. This high current pulse through the coil 25 produces a magnetic field shown by the dotted area 31, typically permeating a defined test area 32 in the structure, shown by the dashed lines. At this point, when the current in coil 25 has reached a peak value a high density magnetic field on the order of 30–80 K Gauss has been established in the defined test area of the laminate structure, the precise value of field being dependent on the material, and the quantity of pressure desired.

When the current in coil 25 reaches a predetermined peak value, the switching circuit 29 switches the storage device 28 into coil 26. This energy storage circuit is arranged so as to provide a fast pulse of current in coil 26, opposing that established in coil 25, the amplitude of the fast pulse being somewhat less than the peak value of the slow or background pulse in coil 25, and having a duration between 0.5 and 20 microseconds, again depending on the material used. The established magnetic field outside of the article being tested, that is, the field between the surface 33 of the sheet 21 and the coil 25, is thus rapidly sent to zero, by the counteracting magnetic field established by the current through coil 26. The magnetic field in the article itself, however, is still at a high point, although beginning to diffuse through the structure. A high magnetic field gradient is thus established between the interior of the article and its surface 33. This high field gradient creates an internal pressure tending to push the metal sheet 21 away from the metal sheet 22, thus creating an intense tensile pressure on the adhesive bond line 23. Using the currents noted above, within a specified test area, tensile pressures of 3,000 psi and higher can be created on the bond, thus providing an adequate tensile strength test. Should the bond line be weak, delamination of the bond line and occasionally surface bubbles will occur, indicating a discontinuous or failure prone bond. Such delamination can be detected as with detector 37 by standard, well-known techniques, such as mechanical fingers, visual inspection, or X-ray and acoustic techniques. Should the bond survive the tensile stress, no structural or appearance damage is done to the structure being tested. The amount of pressure may be controlled by controlling the maximum current values, and the switching times of the energy storage circuits relative to each other.

The present invention thus utilizes a rapid reversal of magnetic fields to effectuate intense internal pressures in a laminated metal structure. Short duration pulses are utilized so as to prevent undesirable $I^2R$ heating of the metal sheets. By combining a high amperage slow, or background, current pulse with an extremely fast high amperage current pulse of opposing polarity to effectuate a rapid reversal of magnetic field in a bonded metal article, and utilizing a coil system for inductively producing the magnetic fields, a reliable nondestructive test of metal bond lines is provided.

Figure 6:
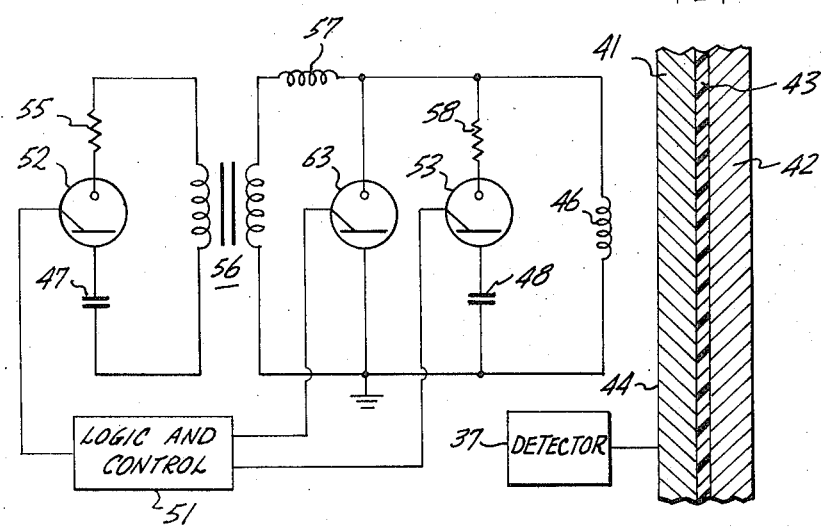
FIG. 6 is a simplified schematic diagram of the apparatus of the present invention.

Referring to FIG. 6, a more detailed diagram of the present invention is shown. Again, a metal-to-metal laminate structure comprising two metal sheets 41 and 42, and an adhesive bond line 43 is shown for purposes of illustration, although various other metal laminate structures, such as honeycombs, may be just as easily utilized. The apparatus of the present invention is again shown adjacent a single surface 44 of metal sheet 41, although duplicate devices may be utilized so as to provide simultaneous testing of both outside surfaces of the laminate structure. The circuit shown in FIG. 6 utilizes a single coil 46 for providing both the background field and fast field, instead of the dual coil system shown in FIG. 3. The single coil system has certain advantages over a dual coil system in that it eliminates any possibility of repulsive forces being established between two coils, and possibly provides a stronger background field than a dual coil system, because the background field coil may now be relatively closer to the test area with respect to the fast coil, since they are one and the same coil. Otherwise, the operation of the coil with respect to the opposing current pulses remains nearly identical to that of the dual coil system. Either the one or multiple coil system may be simply referred to as an inductive system.

The single pancake coil 46 will in typical operation be a copper inductor of rectangular cross section wound in a single spiral of 12 turns, having an inner diameter of 0.7 inches, an outer diameter of 2.2 inches, and a total thickness of 0.2 inches. The coil typically is imbedded in an epoxy structure so as to withstand the forces present during the compression-tension cycle of the alternating magnetic pulses. The coil is placed at a distance from the test article such that a background magnetic field may be established in the article quickly by means of the background current pulse, while allowing a rapid reversal of the magnetic field between the coil and the article due to the fast current pulse.

Working into this single coil 46 are capacitive energy storage banks 47 and 48. Storage bank 47 is utilized for the background current pulse, and has a total capacitance of approximately 720 microfarads. Associated with energy storage bank 47 is a power supply, not shown, which powers the energy storage bank to 10 kilovolts. The energy storage circuit supplying the fast current pulse is capacitive bank 48, having a value of approximately 60 microfarads. An associated power supply, not shown, maintains the bank 48 at an operating voltage of 10 kilovolts. The switching of the two capacitive banks 47 and 48 into the coil 46 is controlled by a control logic circuit 51 which comprises standard logic and relay circuitry, providing control signals at predetermined times with respect to the overall testing cycle. Two switching ignitrons 52 and 53 are connected in series with the capacitive banks 47 and 48. These ignitrons are standard mercury-filled rectifier tubes capable of handling the high currents from the capacitive banks, and are used for switching. Other switching devices capable of handling high currents would also be satisfactory. At appropriate times, as determined by the control circuit 51, the two ignitrons 52 and 53 are fired, allowing the energy stored in the capacitive banks 47 and 48 to discharge through the pancake coil 46.

With the capacitive bank 47 charged to a peak value by a standard power supply, not shown, the energy in the capacitive bank is discharged, by firing of the ignitron 52, through circuit resistance 55 and through the primary winding of an impedance matching transformer 56. The capacitance of the bank 47 is transformed into a large capacitance value by the transformer 56, so as to achieve a relatively slow current rise time through the coil 46. The primary winding might typically be provided with several different taps so as to provide a variable rise time, if desired, and to thus change the repetition rate of the magnetic pulses in a particular test area. The matching transformer 56 matches the impedance of the coil to the impedance of the slow bank circuit and by means of the primary taps, allows the frequency of the slow pulse to be controlled. Additionally, the matching transformer, by inverting the polarity of the slow current pulse, allows both capacitive banks to be charged positive with respect to ground. A pulsing current is thus produced in the secondary winding of the transformer 56, and passes through an isolating inductor 57 to the coil 46.

Figure 4:
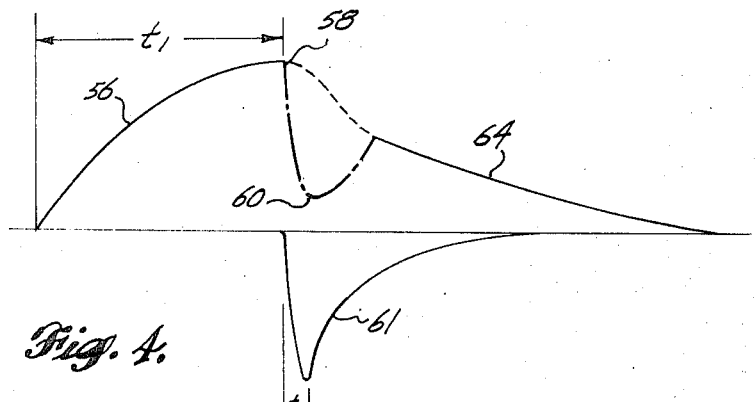
FIG. 4 is a timing diagram showing the time relationship between the slow energy pulse, the fast energy pulse and the composite current level in the coil.

The current in the coil 46 thus rises at a time rate determined by the inductance of the primary winding of the transformer 56. Referring to FIG. 4, time $t_1$ is the rise time of the current through the coil 46 due to the background current pulse 56 shown in FIG. 4 as increasing in the positive direction. Time $t_1$ is, as noted above, variable, typically between 0.2 milliseconds and 10 milliseconds, depending on the material used.

Figure 5:
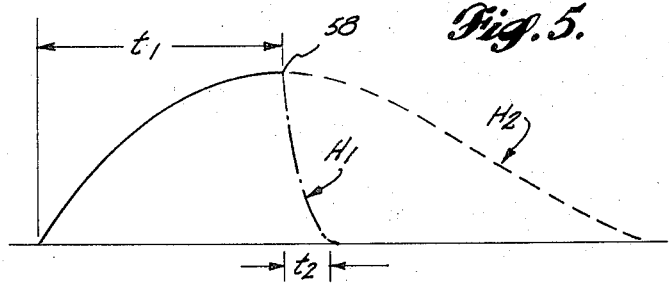
FIG. 5 is a diagram of the fields $H_1$ and $H_2$.

During time $t_1$, when the current in coil 46 is increasing from a zero value in the positive direction, as shown, to some given maximum value at point 58, a magnetic field $H_2$ is being established within the testing structure, and a magnetic field $H_1$ is being established in the area immediately surrounding the coil 46, up to the surface 44 of the structure. Referring to FIGS. 4 and 5, at point 58 in the current rise, both $H_1$ and $H_2$ will be tending toward or nearly at a maximum steady state value. At this point in time, at the peak value of the background current pulse 56, ignitron 53 is fired by the control circuitry 51, allowing the energy stored in capacitive bank 48 to discharge through coil 46. This current pulse, however, will be 180° out of phase with the current produced by the slow bank 47 and thus will tend to oppose the current already established in the coil 46.

The fast current pulse produced by capacitive bank 48, passing through ignitron 53 and series resistance 58 produces a pulse similar to that shown as 61 in FIG. 4. It is very fast, beginning at point 58 in time, and rises to a maximum value somewhat less than the peak value of the slow pulse, in a time $t_2$ of 0.5 to 20 microseconds. This fast pulse 61 drops the composite current in the coil 46 to a predetermined current value 60 in time $t_2$, or significantly more rapidly than present methods of high current shutoff. This predetermined current value results in $H_1$ being equal to zero, as shown in FIG. 5.

At this point in time, when the current produced by the fast bank 48 is at a maximum, the current in the coil is at a predetermined value, and $H_1$ is at zero. An isolating inductor 57 of 200 – 300 microhenrys prevents the fast bank 48 from discharging back through the impedance matching transformer 56, and thus insures the discharge of the capacitive bank 48 through the coil. At this point in time, when the fast negative pulse 61 reaches a predetermined peak value, the control circuit 51 fires ignitron 63, thus shorting to ground both the capacitive bank 48 and the coil 46. The coil sees a reverse current 64 from energy bank 47 after this point, but eventually stabilizes to a steady state zero value. The slow or background pulse current produced by capacitor bank 47 continues to flow through the bank 47, the series inductor 57, and ignitron 63, until ignitron 52 shuts off at current reversal. Any remaining charge on capacitance bank 47 is then discharged through a series of dumping resistances, not shown. At this point, capacitor banks 47 and 48 are both discharged, ignitrons 52 and 53 are both returned to their normal off position, and one cycle of the testing procedure has been completed.

The two current pulses will now be re-examined with respect to the interaction of the resultant magnetic fields. Referring to FIG. 6, as the current through the coil 46 rises from a steady state level to some peak value, during time $t_1$, as shown in FIG. 4, a steadily increasing magnetic field is expanding away from the surface of the coil 46. This expanding magnetic field will tend to establish a magnetic field $H_2$ within the laminate structure itself, as well as a magnetic field $H_1$ between the coil 46 and surface 44 of the laminate article. During time $t_1$, the expanding magnetic field induces currents in the face sheet 41 of the laminate article, producing a resultant compression stress on the sheet. The magnitude of the stress is proportional to the rate of expansion of the magnetic field, i.e., the rise time of the current in the coil.

It is, of course, desirable to minimize this compression stress on the structure, so the pulse length of the background current pulse is adjusted to be just long enough not to cause excessive compression stress on the structure. The duration of the background current pulse is a trade-off between undesirable compression stress, which is a direct function of the rapidity of the rise time of the pulse, and undesirable temperature rises in the coil and the face sheet, which are a direct function of the duration of the pulse. Again, it has been found that a background pulse duration $t_1$ of between 0.2 milliseconds and 10 milliseconds is adequate for the purposes of the present invention, the exact $t_1$ used depending on the material. At time point 58, relative to the current rise of the slow pulse through coil 46, the magnetic fields $H_1$ and $H_2$ will both be at a maximum as shown in FIG. 5, as the rate of change of the current through the coil is nearly zero. At this point, the fast pulse capacitive bank 48 is discharged, producing a very fast, high amplitude current pulse through the coil 46 in a polarity opposing that of the slow current pulse. This fast pulse very rapidly sends the current through the coil 46 to a predetermined value and field $H_1$ rapidly goes to zero. However, the magnetic field $H_2$ established within the laminate article is still at or near a peak value for the period $t_2$, if $t_2$ is fast enough, as the diffusion of the magnetic field in the article is far less rapid than the diffusion of the magnetic field $H_1$ in air. Thus, when $H_1$ goes to zero, $H_2$ will still be quite large as shown in FIG. 5.

This results in a large magnetic field gradient between specific points in the article and the one surface. This large field gradient results in extremely high tensile pressures at th bond line, tending to force the surface plate 41 outward from the rest of the structure. Sufficient tensile pressures, from 800 psi and up to as much as 10,000 psi can be created, so as to sufficiently test the tensile strength of most bonds. The amplitude of the pressure will be dependent upon the rate of diffusion of the magnetic field $H_2$, and the rate at which $H_1$ can be forced to go to zero. The longer the time that $H_1$ requires to reach zero, the lower the field gradient will be, and hence, the lower the resulting pressure. Likewise, the faster the rate of diffusion of magnetic field $H_2$ through the structure, the lower the field gradient will be for a given time during which $H_1$ goes to zero, and the lower the resulting pressure on the bond.

Thus, it is desirable that the current through the coil after time point 58 in FIG. 4 be forced to a predetermined value for which $H_1$ is zero, as rapidly as possible, while $H_2$ remains as large as possible. An optimum combination of these two factors will result in $H_2$ remaining at a maximum value during the time $H_1$ is reduced to zero. This optimum results in a maximum negative field gradient between the field $H_2$ internal of the structure, and field $H_1$, immediately adjacent the surface 44 of the structure. This results in a maximum tensile pressure on the bond, tending to push the surface plate 41 outward.

A method and apparatus has thus been disclosed for testing bonds of metal laminate structures. As described, the method may be utilized to test the entire area of a bond, with deformation or destruction of the tested article resulting only when there is a failure. Furthermore, the test may be carried out from one side of the article or both sides at one time if desired, and the test may be accomplished either during production, as a quality control step, or in situ, when the structure to be tested is in place in a machine, or other device. Furthermore, the method can be utilized as a continuing check of bond strength, after the structure has undergone many hours of use, to identify possible failure areas created by fatigue.

Although an exemplary embodiment of the invention has been disclosed herein for the purposes of illustration, it will be understood that various changes, modifications and substitutions may be incorporated in such embodiment without departing from the spirit of the invention as defined by the claims which follow:

What is claimed is:

1. A method of testing adhesive bond lines in a laminated article having at least one surface, which article is receptive to the establishment of a magnetic field therein, comprising the steps of:

establishing a first magnetic field within said article, including said adhesive bond line, which first magnetic field reaches a predetermined amplitude;

rapidly decreasing said first magnetic field in the vicinity of the one surface of said laminated article at such a rate that a substantial negative field gradient is established between the one surface and said adhesive bond line before said first magnetic field in the vicinity of said bond line can substantially collapse from said predetermined amplitude if otherwise permitted to collapse upon the initiation of the step of decreasing, said negative field gradient resulting in a stress on said adhesive bond line; and detecting a bond failure in said laminated article due to said stress.

2. A method in accordance with claim 1, wherein the step of decreasing includes the step of generating a second magnetic field in the vicinity of the one surface of said laminated article, said second magnetic field opposing said first magnetic field.

3. A method in accordance with claim 2, wherein the step of generating includes applying a first current pulse of a given polarity through an inductive system positioned away from the one surface of said laminated article.

4. A method in accordance with claim 3, wherein the step of establishing includes applying a second current pulse of a polarity opposite to that of said first current pulse through said inductive system.

5. A method in accordance with claim 4, wherein the rise time of said second pulse is slow compared to the rise time of said first current pulse.

6. A method in accordance with claim 5, wherein said first current pulse is initiated in time at substantially the peak value of said second current pulse.

7. A method in accordance with claim 6, wherein the magnetic field present in the vicinity of said one surface is substantially zero when said first current pulse is at substantially a peak value.

8. A method in accordance with claim 7, wherein duration of said first current pulse from initiation to peak value is substantially in the range of 0.5 microseconds to 20.0 microseconds.

9. A method in accordance with claim 8, wherein the duration of said second current pulse from initiation to peak value is substantially with the range of 0.2 milliseconds to 10 milliseconds.

10. A method in accordance with claim 1, including the step of terminating the step of decreasing at a predetermined time.

11. An apparatus for testing an adhesive bond line in a laminated article having at least one surface, which article is receptive to the establishment of a magnetic field therein, comprising:

means for establishing a first magnetic field within said laminated article, including said adhesive bond line, which first magnetic field rises to a predetermined amplitude;

means for rapidly decreasing said first magnetic field at the one surface of said laminated article at such a rate that a substantial negative magnetic field gradient is established between the one surface and said adhesive bond line before said first magnetic field can substantially collapse from said predetermined amplitude if otherwise permitted to collapse upon the initiation of the decreasing of said first magnetic field at the one surface, said negative field gradient resulting in a stress on said adhesive bond line; and means for detecting a delamination of said adhesive bond line.

12. An apparatus according to claim 11, wherein said decreasing means includes means for generating a second magnetic field in the vicinity of said one surface, said second magnetic field opposing said first magnetic field.

13. An apparatus according to claim 12, including a coil means positioned adjacent to but not touching said one surface, means for generating a first current pulse of a given polarity, and means for applying said first current pulse to said coil means, thereby generating said second magnetic field, the generation of said second magnetic field reducing the magnetic field at said one surface substantially to zero.

14. An apparatus according to claim 13, wherein said establishing means includes means for generating a second current pulse of a polarity opposite to that of said first current pulse, and means for connecting said second current pulse to said coil means, which second current pulse establishes an expanding first magnetic field outward from said coil means, establishing said first magnetic field encompassing said adhesive bond line.

15. An apparatus according to claim 14, including means for controlling the initiation of said first and second current pulses, said first current pulse being initiated in time at substantially a peak value of said second current pulse.

16. An apparatus according to claim 14, wherein said second current pulse generating means includes first energy storage means and first switching means, said first current pulse being of such a magnitude that said predetermined amplitude of said first magnetic field is substantially within the range of 30 kilogauss to 80 kilogauss.

17. An apparatus according to claim 12, including means for terminating the operation of said decreasing means at a predetermined time.

18. The apparatus according to claim 17, wherein said terminating means includes a means for connecting said decreasing means to ground potential at said predetermined time.

* * * * *

UNITED STATES PATENT OFFICE
CERTIFICATE OF CORRECTION

Patent No. 3,825,819     Dated July 23, 1974

Inventor(s) Karl A. Hansen and Clarence D. Lunden

It is certified that error appears in the above-identified patent and that said Letters Patent are hereby corrected as shown below:

Column 8, line 56, delete the word "with" and substitute therefor the word --within--.

Signed and sealed this 5th day of November 1974.

(SEAL)
Attest:

McCOY M. GIBSON JR.
Attesting Officer

C. MARSHALL DANN
Commissioner of Patents

UNITED STATES PATENT AND TRADEMARK OFFICE

Certificate

Patent No. 3,825,819            Patented July 23, 1974

Karl A. Hansen and Clarence D. Lunden

Application having been made by Karl A. Hansen and Clarence D. Lunden, the inventors named in the patent above identified, and The Boeing Company, Seattle, Washington, the assignee, for the issuance of a certificate under the provisions of Title 35, Section 256, of the United States Code, adding the name of Sheng Y. Peng as a joint inventor, and a showing and proof of facts satisfying the requirements of the said section having been submitted, it is this 29th day of April 1980, certified that the name of the said Sheng Y. Peng is hereby added to the said patent as a joint inventor with the said Karl A. Hansen and Clarence D. Lunden.

FRED W. SHERLING,
*Associate Solicitor.*